United States Patent
SaavedraSilvia et al.

(10) Patent No.: US 9,715,030 B1
(45) Date of Patent: Jul. 25, 2017

(54) OBJECT DETECTION AND REMOVAL APPARATUS

(71) Applicants: Matias SaavedraSilvia, Wilmington, DE (US); Joshua Stone, Wilmington, DE (US); Justin DiGiovanni, Wilmington, DE (US); Daniel Barnes, Wilmington, DE (US); Hagan Beatson, Wilmington, DE (US); Rowan Davis, Wilmington, DE (US); Joclynn Fogelman, Wilmington, DE (US); Jacob Gladfelter, Wilmington, DE (US); Noah Haines, Wilmington, DE (US); Dylan McAllister, Wilmington, DE (US); Wyatt McCabe, Wilmington, DE (US); Tatyana Nesterova, Wilmington, DE (US); Taylor Nguyen, Wilmington, DE (US); Michael Slemko, Wilmington, DE (US); Michael Zullo, Claymont, DE (US)

(72) Inventors: Matias SaavedraSilvia, Wilmington, DE (US); Joshua Stone, Wilmington, DE (US); Justin DiGiovanni, Wilmington, DE (US); Daniel Barnes, Wilmington, DE (US); Hagan Beatson, Wilmington, DE (US); Rowan Davis, Wilmington, DE (US); Joclynn Fogelman, Wilmington, DE (US); Jacob Gladfelter, Wilmington, DE (US); Noah Haines, Wilmington, DE (US); Dylan McAllister, Wilmington, DE (US); Wyatt McCabe, Wilmington, DE (US); Tatyana Nesterova, Wilmington, DE (US); Taylor Nguyen, Wilmington, DE (US); Michael Slemko, Wilmington, DE (US); Michael Zullo, Claymont, DE (US)

(*) Notice: Subject to any disclaimer, the term of this patent is extended or adjusted under 35 U.S.C. 154(b) by 0 days.

(21) Appl. No.: 15/062,435

(22) Filed: Mar. 7, 2016

(51) Int. Cl.
  *B07C 5/34* (2006.01)
  *G01V 3/10* (2006.01)
  (Continued)

(52) U.S. Cl.
  CPC ............... *G01V 3/10* (2013.01); *B07C 5/344* (2013.01); *D06F 93/00* (2013.01); *D06F 95/00* (2013.01);
  (Continued)

(58) Field of Classification Search
  CPC  B07C 5/34; B07C 5/344; B07C 3/003; B07C 3/008; B07C 3/08; B07C 5/3416;
  (Continued)

(56) References Cited

U.S. PATENT DOCUMENTS 2,015,522 A * 9/1935 Hoffman .................. B03B 5/32
 209/205
2,307,695 A * 1/1943 Mansbendel ............. B07C 5/20
 177/52

(Continued)

FOREIGN PATENT DOCUMENTS

CH  DE 102008028120 A1 * 12/2009  ............. D06F 93/00

*Primary Examiner* — Joseph C Rodriguez
(74) *Attorney, Agent, or Firm* — Gerald K. Kita; James M. Lennon (57) ABSTRACT

An apparatus for searching laundry articles to detect foreign objects commingled with the laundry articles, and for removing one or more laundry articles with which at least one detected foreign object is commingled, the apparatus including a detector creating a magnetic field through which the laundry articles are conveyed by a conveyor, and a removal mechanism activated by a trigger signal from the detector for removing from the conveyor one or more of the laundry articles with which at least one detected foreign (Continued)

object is commingled, and leaving other laundry articles on the conveyor for continued conveyance and free from detected foreign objects.

12 Claims, 4 Drawing Sheets

(51) Int. Cl.
*D06F 93/00* (2006.01)
*D06F 95/00* (2006.01)
*B07C 5/344* (2006.01)
*B07C 5/36* (2006.01)

(52) U.S. Cl.
CPC ...... *B07C 5/361* (2013.01); *B65G 2201/0229* (2013.01)

(58) Field of Classification Search
CPC ......... B07C 5/361; B07C 5/362; B07C 7/005; Y10S 209/937; D06F 93/00; G01V 8/10; B65G 47/48; B65G 2201/0229
See application file for complete search history.

(56) References Cited

U.S. PATENT DOCUMENTS

| | | | | |
|---|---|---|---|---|
| 2,646,882 A * | 7/1953 | Frost, Jr. | | B03D 1/06 209/170 |
| 2,787,453 A * | 4/1957 | Hibshman | | B01D 3/24 202/158 |
| 2,923,410 A * | 2/1960 | Tschmelitsch | | B03B 5/06 209/484 |
| 3,559,806 A * | 2/1971 | Bevins | | B65G 47/82 209/577 |
| 4,011,155 A * | 3/1977 | Feurstein | | B07C 5/3412 156/351 |
| 4,171,262 A * | 10/1979 | Lattmann | | B07C 5/344 209/555 |
| 4,284,499 A * | 8/1981 | Moudgil | | B03D 1/00 209/166 |
| 4,344,844 A * | 8/1982 | Townley | | B03B 1/04 209/1 |
| 4,480,753 A * | 11/1984 | Thomas | | B07C 5/344 209/546 |
| 4,863,588 A * | 9/1989 | Herron | | B03B 5/26 209/44 |
| 4,868,910 A * | 9/1989 | Maulding | | G01V 3/107 324/233 |
| 5,001,425 A | 3/1991 | Beling et al. | | |
| 5,121,105 A | 6/1992 | Aittoniemi | | |
| 5,141,111 A * | 8/1992 | Licht | | B07C 5/362 209/558 |
| 5,596,277 A * | 1/1997 | Rowan | | G01V 3/107 324/262 |
| 5,617,955 A * | 4/1997 | Tanner | | B03B 5/26 209/458 |
| 5,632,935 A * | 5/1997 | Yeoman | | B01D 3/163 261/114.1 |
| 6,085,914 A * | 7/2000 | Tobaccowala | | B07C 7/005 100/91 |
| 6,222,450 B1 | 4/2001 | Clements | | |
| 6,268,724 B1 * | 7/2001 | Crowley | | G01V 3/107 324/225 |
| 6,724,305 B2 * | 4/2004 | Edwards | | B65F 1/1607 209/570 |
| 6,799,681 B1 * | 10/2004 | Warren | | B03B 5/26 209/268 |
| 7,268,313 B1 * | 9/2007 | Aldridge | | D06F 93/00 209/583 |
| 7,423,422 B2 | 9/2008 | Kubotera et al. | | |
| 7,683,779 B1 | 3/2010 | Pacheco | | |
| 8,305,088 B2 * | 11/2012 | Kiss | | B07C 5/344 324/233 |
| 8,662,314 B2 | 3/2014 | Jones et al. | | |
| 8,678,192 B1 * | 3/2014 | Pung | | B03B 5/26 209/18 |
| 9,297,110 B2 * | 3/2016 | Mocker | | D06F 93/00 |
| 2007/0063848 A1 * | 3/2007 | Weisman | | G01V 3/15 340/573.1 |
| 2011/0210740 A1 * | 9/2011 | Candy | | G01V 3/107 324/329 |
| 2012/0195697 A1 * | 8/2012 | Osiensky | | D06F 93/00 406/2 |
| 2015/0292142 A1 * | 10/2015 | Tautz | | B25J 11/00 414/800 |
| 2015/0355634 A1 * | 12/2015 | Kotula | | G08B 3/10 700/110 |
| 2016/0145055 A1 * | 5/2016 | Sielermann | | B65G 47/90 414/751.1 |

\* cited by examiner

OBJECT DETECTION AND REMOVAL APPARATUS

BACKGROUND OF THE INVENTION

Field of the Invention

In a working environment, a need is present for searching, detecting and removing foreign objects that would otherwise be commingled with laundry articles. In one such working environment, large numbers of laundry articles are subjected to a picking and sorting operation, wherein the laundry articles are deposited onto a moving belt conveyor, while several workers manually pick the laundry articles off the conveyor and quickly sort them. The workers quickly sort them by flinging them into respective sorting bins that receive different kinds of laundry articles. The workers quickly pick and fling the laundry articles in as little time as possible. A foreign object commingled with the laundry articles could injure a worker who comes into contact with the foreign object while the worker manually picks and sorts the laundry articles. In another working environment wherein laundry articles are being laundered or cleaned, a foreign object commingled with the laundry articles could damage laundry equipment during a laundering or cleaning operation, and could damage the laundry articles themselves. In another working environment wherein laundry articles may be conveyed on a conveyor for disposal as infectious waste, valuable surgical instruments need to be detected and removed to avoid their costly disposal.

Description of the Prior Art

A problem in the health care industry is to assure the safety of workers whose job it is, to pick and sort laundry articles. However, foreign objects may be overlooked when commingled with the laundry articles. Foreign objects in the form of surgical instruments include sharp and potentially injurious objects, including but not limited to scalpels, forceps, scissors, saws and syringes, to name a few. As a consequence, a need is present for conducting searches of laundry articles to detect and remove foreign objects. A process of hand searching for foreign objects would be time consuming, and would expose workers to potential injury from contact with foreign objects while searching. In addition, valuable surgical instruments can be lost. A need is present for detection and retrieval of valuable surgical instruments to avoid their loss.

U.S. Pat. No. 5,001,425 discloses a patented metal detector to cover a waste disposal receptacle for use in a hospital environment to detect the inadvertent disposal of metal articles in such a receptacle. Metal objects entering the disposal receptacle cause triggering of a detector alarm system.

U.S. Pat. No. 6,222,450 describes a patented metal detector to detect the inadvertent disposal of metal objects such as surgical instruments into a waste disposal receptacle. Specifically, the device operates with a magnetic field. A mechanism calibrates a detection coil by comparing the output voltage thereof caused by a change in the surrounding electromagnetic field to a reference voltage to establish a threshold voltage. When the threshold voltage is exceeded by detection of a surgical instrument, multiple pulse emitting members are activated to emit output pulses directed toward multiple pulse detection members. A surgical instrument entering into the disposal receptacle will interrupt and block a pulse, which triggers an alarm.

However, the patented metal detectors do not remove detected metal objects from a waste disposal receptacle. Further, instead of a metal object being discarded in a waste disposal receptacle, the metal object may be overlooked when commingled with a laundry article, and may unintentionally accompany the laundry article in various working environments: picking and sorting, washing, cleaning, or disposal of the laundry articles as infectious waste.

U.S. Pat. No. 7,683,779 describes a metal detector useful in the hospitality industry for detecting flatware left on food trays, wherein the flatware is commingled with food scraps on the food trays. However, the detector does not remove flatware from the trays.

U.S. Pat. No. 8,662,314 discloses an apparatus and a method for removing foreign material and undesirable articles from a product stream. A mechanical diverter is responsive to an inspection station to launch or redirect undesirable articles in an alternate path. An air ejector is responsive to the inspection station to dislodge foreign material from the product stream. An air diverter in one form of the patented invention is responsive to the inspection station to dislodge foreign material from the product stream.

U.S. Pat. No. 5,121,105 describes a metal detector for detecting metal objects in materials passing through the apparatus by means of a magnetic field induced by eddy currents. And in an area located between a transmitter coil system and a receiver coil system of the metal detector, there is installed at least one electrically insulated but electroconductive and/or magnetic element in order to change the sensitivity distribution of the metal detector.

U.S. Pat. No. 7,423,422 describes a determination device (detector) producing sample output signals corresponding to a plurality of metallic samples differing in magnitude passing an alternating field, and a memory unit storing data of such sample signals A setting device causes an indicator to display the magnitude of metal detectable by the detector compared on the basis of those data on the samples. And a metal displaying device displays the magnitude of that metal content on the indicator. The user can intuitively become informed of the detectable metal and the magnitude of the metal.

SUMMARY OF THE INVENTION

The present invention relates to an apparatus adapted for operation with a conveyor for searching laundry articles being conveyed by the conveyor to detect foreign objects commingled with the laundry articles, and for removing one or more laundry articles with which at least one detected foreign object is commingled.

An embodiment of an apparatus includes a detector searching laundry articles for a foreign object by creating a magnetic field through which the laundry articles are conveyed by a conveyor, the detector producing an output voltage indicative of a change in the magnetic field, wherein a change in the magnetic field below a threshold change indicates the laundry articles are free from detected foreign objects, and remain on the conveyor for continued conveyance, the detector producing a voltage spike in the output voltage upon at least one foreign object being detected by a change in the output voltage exceeding the threshold change, the voltage spike serving as a trigger signal, and a removal mechanism being activated by the trigger signal, and removing from the conveyor one or more laundry articles with which at least one detected foreign object is commingled, and leaving other laundry articles remaining on the conveyor for continued conveyance, and free from detected foreign objects.

DETAILED DESCRIPTION

As used herein, the term "laundry article" and its plural form of the term thereof refer to articles made from textiles or nonwoven fabrics, which have become soiled during their use. Laundry articles include but are not limited to garments such as surgical gowns, dressing gowns, sleepwear, uniforms, and protective coverings such as gloves, aprons, bandages, drapes, sheets. and bed linens, wherein the laundry articles of one kind comprises disposable laundry articles required to be deposited in a so-called "red bag" for infectious waste disposal, and further wherein laundry articles of another kind are subjected to one or more processes of picking and sorting, washing or cleaning prior to being reused.

Herein, the term "foreign object" and its plural form of the term thereof refer to a tangible object that is different from a laundry article, and intended to be detected and removed from being commingled with one or more laundry articles. Foreign objects include but are not limited to medication administering devices such as syringes and pill dispensers, medical instruments such as those used in a medical diagnostic examination environment and a medical surgery environment and a dentistry environment, and personal items such as identification badges and eyeglasses and writing instruments and eating utensils and other objects left behind by workers or occupants of medical treatment hospitals, rehabilitation treatment hospitals, convalescent residences, nursing homes, hotels. passenger vessels and penal institutions.

Figure 1:
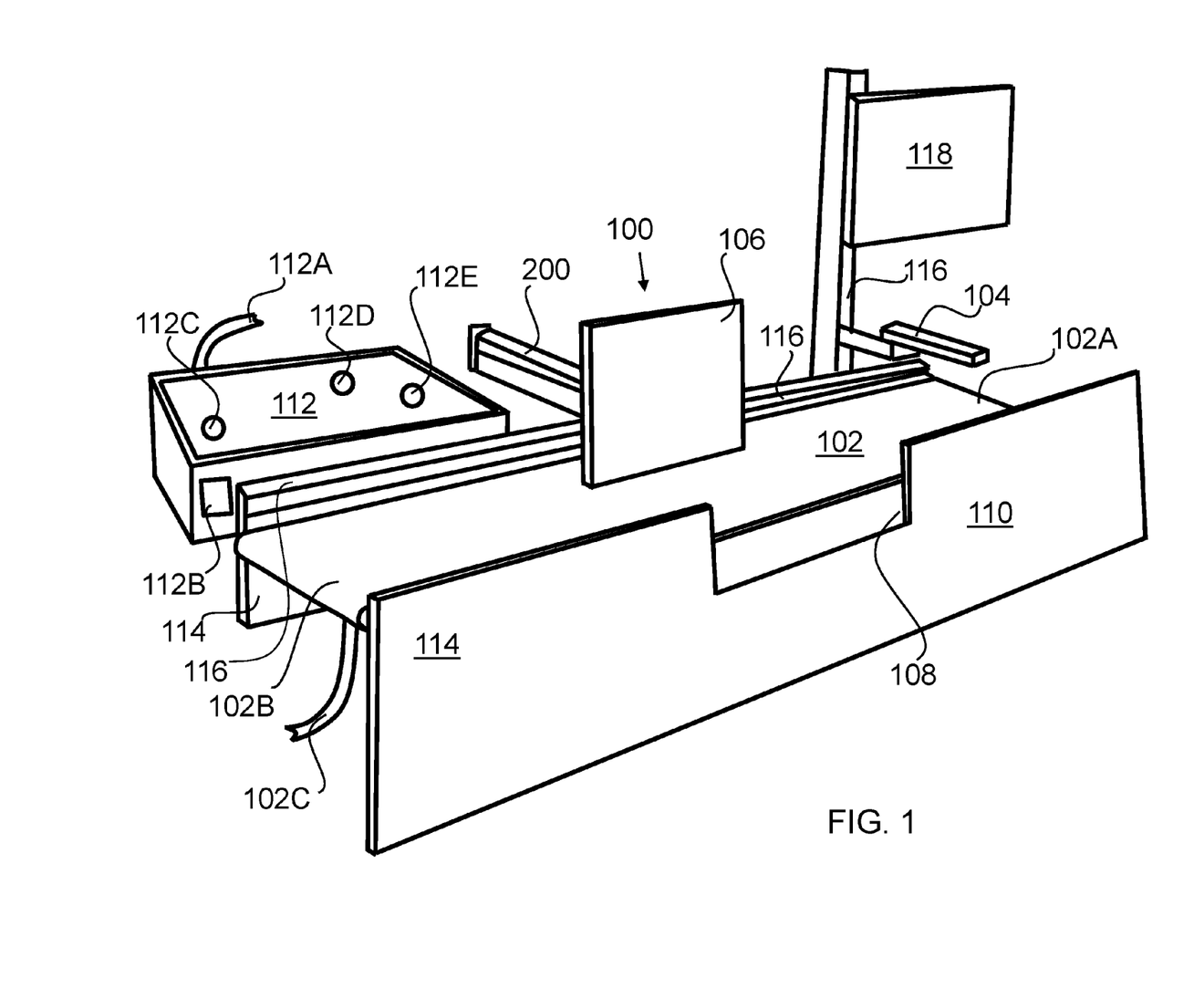
FIG. 1 is a perspective view of an apparatus adapted for operation in conjunction with a conveyor.

FIG. 1 discloses an apparatus 100 adapted for operation with a conveyor, for example, a known conveyor that operates by conveying numerous laundry articles, while several workers quickly pick the laundry articles off the known conveyor, and quickly sort them into different kinds of laundry articles. Prior to the invention, the laundry articles were not searched to detect and remove foreign objects commingled with the laundry articles. All workers performing the picking and sorting operation were vulnerable to potential injury from contact with the foreign objects.

FIG. 1 depicts an experimental conveyor 102 that was built to test the apparatus 100 for proof of concept. The experimental conveyor 102 comprises a motor driven belt conveyor that was salvaged from a dismantled exercise treadmill machine along with its motor drive. The experimental conveyor 102 conveys laundry articles from an input end 102a of the conveyor 102, and toward an opposite end 102b of the conveyor 102. The experimental conveyor 102 is constructed for connection to a source of electrical power by use of a conventional power cord 102c for plug in, connection to a conventional duplex outlet supplying 120 volts, 15-20 Amps of electrical power. An embodiment of the power cord 102c is a Power Switch Tail II, Model 80135, commercially available from Power Switch Tail.Com LLC, by placing a purchase order on their Internet website. Their website describes the power cord that switches 120V volts AC power directly from a micro controller I/O pin (3-12 Volts DC, 3-30 microamps). The power cord has an AC isolated, DC actuated, AC power switch that is tuned on and off directly by voltage signals from an electronic controller 300, FIG. 3. The experimental conveyor 102 is mounted on a conveyor framework 114.

The apparatus 100 includes a detector 104 for detecting a foreign object commingled with one or more laundry articles being conveyed by the conveyor 102, and a removal mechanism 106 for removing one or more laundry articles in which at least one detected foreign object is commingled, and leaving other laundry articles remaining on the conveyor for continued conveyance, and safe for workers to handle.

Figure 3:
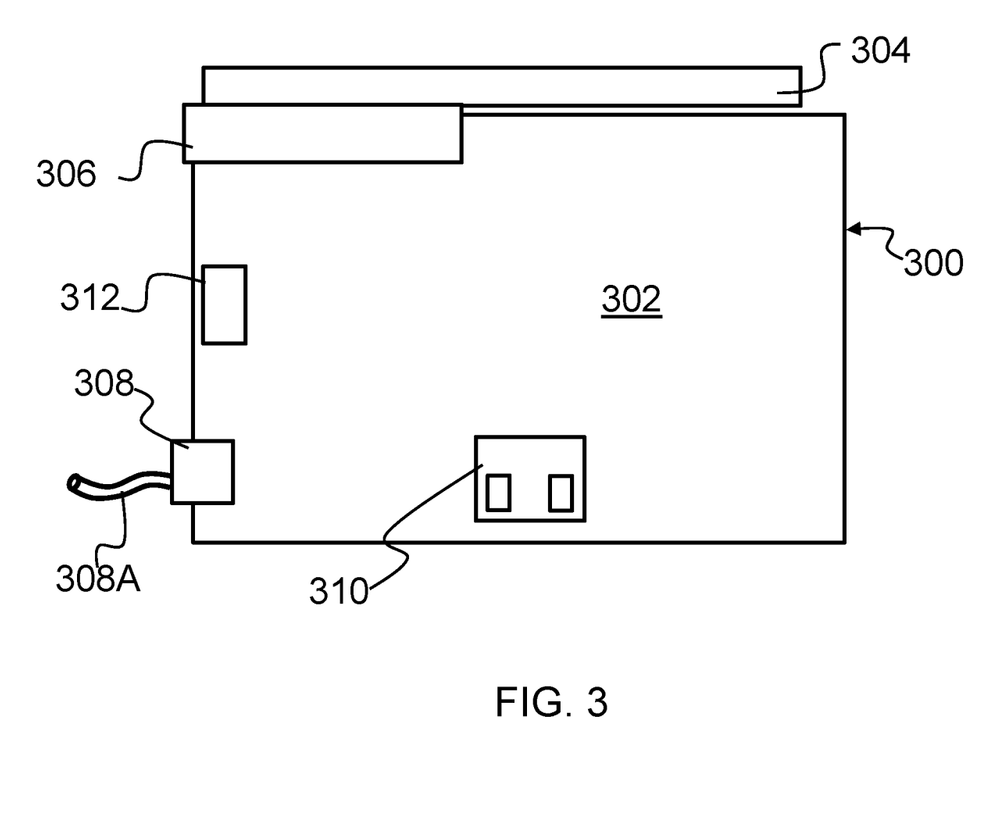
FIG. 3 is a schematic view of an electronic controller for controlling operations performed by the apparatus of FIG. 1.

FIG. 1 further discloses the apparatus 100 comprising a box 112 containing an electronic controller 300, FIG. 3, for controlling operations of the detector 104 and the removal mechanism 106 of the apparatus 100 in coordination with an operation of the conveyor 102. A preferred embodiment of the box 112 includes a conventional. electrical extension cord 112a, which is wired to, and provides power to, the electronic controller 300, and to an electrical outlet 112b on the box 112 for plug in, connection of a conventional electrical power cord, for example, the commercially available Power Switch Tail II, Model 80135 for connecting a motor drive of the conveyor 102 to a source of electrical power. Mounted on the box 112 is an on-off switch 112c connecting or disconnecting the apparatus 100 and the conveyor 102 from electrical power supplied by the extension cord 112a while the apparatus 100 is not being used. An emergency shut off switch 112d in the form of a push button is mounted on the box 112 for emergency turn off of the apparatus 100 and the conveyor 102 from electrical power supplied by the extension cord 112a. A reset switch 112e is mounted on the box 112 for resetting the apparatus 100 in a manner described with reference to FIG. 4.

In FIG. 1, the detector 104 of the apparatus 100 is mounted on a portion of a framework 116. The removal mechanism 106 of the apparatus 100 is mounted on another portion of the framework 116. The apparatus 100 is adapted for operation together with the conveyor 102 by the framework 116 positioning the detector 104 and the removal mechanism 106 adjacent to the conveyor 102 to perform a detection and removal operation in conjunction with operation of the conveyor 102. One preferred embodiment of the apparatus 100 includes the detector 104 and the removal mechanism 106 being mounted on the framework 116 of their own, separate from the conveyor 102 and the box 112, while the box 112 is mounted on the conveyor framework 114. The detector 104 and the removal mechanism 106 on the framework 116 of their own adapts the apparatus 100 for operation together with, either the experimental conveyor 102, or with another conveyor 102 commercially available, for example, a known conveyor 102 already in use for conveying laundry articles while they are being picked and sorted into different kinds of laundry articles.

Another preferred embodiment of the apparatus 100 includes the detector 104, the removal mechanism 106 and the electronic controller 300 being mounted on a framework 116 of their own, separate from the conveyor 102, which adapts the apparatus 100 for operation with, either the experimental conveyor 102, or with another conveyor 102 commercially available, for example, a known conveyor 102 already in use for conveying laundry articles while they are being sorted into different kinds of laundry articles.

The framework 116 is either separate from the conveyor framework 114, or is attached to the conveyor framework 114. Embodiments of either or both the framework 114 and the framework 116 are fabricated from lumber, or alternatively are fabricated from metal to provide an electrical ground or reference electrical potential.

A commercial embodiment of the detector 104 is a GARRETT SUPERSCANNER V, commercially available from Garrett Electronics, Inc., 1881 West State Street, Garland Tex., USA. A search for foreign objects is performed by the detector 104 creating a magnetic field through which each of the laundry articles is conveyed by the conveyor 102, the detector 104 producing an output voltage indicative of a change in the magnetic field caused by one or more of the conveyed laundry articles in the magnetic field, wherein a change in the magnetic field below a threshold change in the magnetic field produces a change in the output voltage below a threshold voltage, which is indicative of an absence of a foreign object being detected. In the absence of a foreign object being detected, the laundry articles are free of detected foreign objects, and remain on the conveyor 102 for continued conveyance.

A change in the magnetic field exceeding a threshold change in the magnetic field produces an output voltage spike exceeding a threshold voltage, which indicates at least one foreign object being detected by the detector 104. The spike in output voltage exceeding the threshold voltage serves as a trigger signal. The trigger signal initiates performance of the removal mechanism 106, the removal mechanism 106 removing from the conveyor 102 one or more laundry articles with which at least one detected foreign object is commingled. An embodiment of the removal mechanism 106 performs removal by engaging and forcefully pushing such one or more laundry articles off the conveyor and through an opening 108 through a barrier 110. The barrier 110, extending laterally alongside the conveyor 102, restrains laundry articles from falling laterally off the conveyor 102 while being conveyed.

Each laundry article that the removal mechanism 106 has removed from the conveyor 102 is available for careful hand searching to find a detected foreign object, while operation of the conveyor 102 continues to convey all the laundry articles that are free from detected foreign objects.

An alternative second preferred embodiment of the invention includes an optional video monitor 118, which is mounted on the framework 16. In the alternative preferred embodiment, the output voltage of the detector 106 is converted to a video signal displayed as a graph appearing as a video image on the video monitor 118. A change in amplitude voltage below a threshold change in the magnetic field indicates an absence of a foreign object being detected. A change in the magnetic field exceeding a threshold change in the magnetic field indicates detection of at least on foreign object, and is displayed on the video monitor 118 as an amplitude spike of the video image. An alternative embodiment of the invention includes the optional video monitor 118 being provided for visual verification of the voltage output values during operation of the apparatus 100.

An alternative third preferred embodiment of the apparatus 100 is constructed with the video monitor 118 and a manually actuated on and off switch 112c operated by a human operator for turning off the conveyor 102. Upon observation of a voltage spike on the video monitor 118 indicating detection of a foreign object, the operator manually turns off the switch 112c to stop the conveyor 102 following a time interval within which the operator observes conveyance of the detected foreign object being moved into position for removal by the removal mechanism 106.

Figure 2:
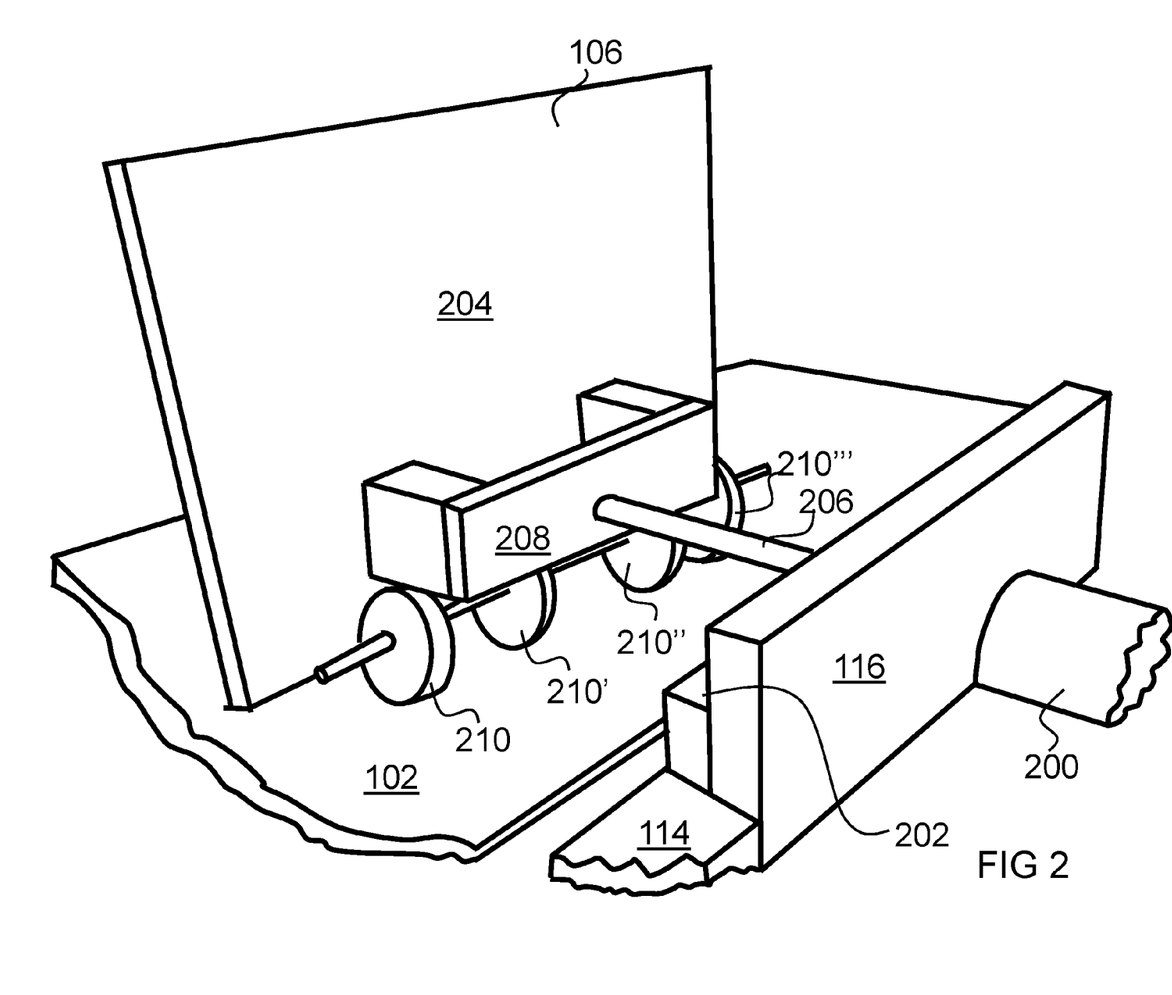
FIG. 2 is a fragmentary perspective view of a removal mechanism of the apparatus of FIG. 1, and for purposes of illustration, the removal mechanism being shown in a position displaced from its reset position shown in FIG. 1.

FIG. 2 discloses a preferred embodiment of the removal mechanism 106. the removal mechanism 106 comprises, a double acting pneumatic cylinder and piston assembly 200.

A dual air outlet, voltage switched, double action, solenoid valve 202 is shown in schematic form, and is located in FIG. 2 for convenience in illustration, and can be located in other places, as well. The solenoid valve 202 is for connection to a source of compressed air, for example, a conventional air cylinder. The removal mechanism 106 further comprises a ram element 204 connected to a projecting piston rod 206 of the assembly 200. The ram element 204 is in the form of a vertical blade mounted on a chassis 208, the chassis 208 having multiple wheels 210 for rolling engagement on the conveying surface of the conveyor 102. An embodiment of the pneumatic cylinder and piston assembly 200 is Model D24200T-M cylinder 1½ in BORE 20 in STROKE, double acting magnetic piston, commercially available from AUTOMATION DIRECT.COM, Cummings, Ga., USA. An embodiment of the solenoid valve 202 is an AirTac Valve Model 4V210-08, available from AirTac International Group, Taiwan. An embodiment of the air cylinder is a Portable Air Tank Model Number T88011, 125 PSI max, from Torin Big Red Jacks, Inc., Ontario, Calif., USA.

Compressed air from the conventional air cylinder is supplied through the solenoid valve 202, and into the pneumatic cylinder and piston assembly 200. The commercial embodiment of the solenoid valve 202 comes equipped with a voltage activated switch to receive a turn on voltage signal and a reset voltage signal, respectively. The conveyor 102 conveys the one or more laundry articles with which the detected foreign object is commingled into a position for removal in front of the ram element 204. The assembly 200 is activated to perform a removal operation, wherein the solenoid valve 202 is activated by a turn on voltage signal to input compressed air into a first end of a cylinder of the assembly 200, and to impel its piston in a first direction, such that the cylinder and piston assembly 200 drives the ram element 204 to engage and forcefully impel such one or more laundry articles with which said at least one detected foreign object is commingled, leaving remaining laundry articles on the conveyor 102 for continued conveyance. The cylinder and piston assembly 200 is selected for a stroke sufficiently lengthy to drive the ram element 204 substantially across the width of the conveyor 102 to remove such such one or more laundry articles off the conveyor 102. Following such removal, the assembly 200 is activated in a reset mode, wherein the solenoid valve 202 is activated by a reset voltage signal to input compressed air into a second end of the cylinder to retract its piston, such that the cylinder and piston assembly 200 drives the removal mechanism 100 to a reset position, such reset position being shown in FIG. 1.

FIG. 3 discloses an electronic controller 300 controlling the operation of the apparatus 100, including a programmable computer 302 combined with a device known as a shield 304. The shield 304 is depicted schematically for convenience of illustration. An embodiment of the computer 302 is a Raspberry Pi 2, Model B 1 GB computer, a tiny yet powerful single board computer, commercially available from Dexter Industries, http://dexterindustries.com. A commercial embodiment of the shield 304 is an Arduberry shield, commercially available from Dexter Industries, by accessing an Internet website, http://dexterindustries.com. The website has color photographs of the Raspberry Pi 2, Model B 1 GB computer.

The present invention utilizes the Raspberry Pi 2 computer 302 and the Arduberry shield 304 to control an operation of the apparatus 100 in conjunction with operation of the conveyor 102. In FIG. 3, The Raspberry Pi 2 computer 302 comes equipped with electrical connectors, which allow electrical connections to be made without soldering onto electrical circuits in the Raspberry Pi 2 computer 302. FIG. 3 depicts the electrical connectors provided by the Raspberry PI 2 computer 302, which are utilized for controlling the apparatus 100, and which include: GPIO Headers 306, a MICRO USB Power (5V 1A DC) connector 308 and a HDMI OUT connector 310. An additional SD Card Slot connector 312 is also provided for plugin connection of a 4 Gigabyte memory component of the Raspberry Pi 2 computer 302 without a need for soldering.

The GPIO Headers 306 interconnect the Arduberry shield 304 without a need for soldering. The MICRO USB Power (5V 1A DC) connector 308 is for connecting the Raspberry Pi 2 computer 302 to a source of electrical power, which is a conventional wall outlet, in a conventional manner using a familiar, conventional power cord 308*a* for a personal size computer. A wall outlet is a familiar duplex electrical outlet of 120 Volts AC, 15-20 Amps.

Figure 4:
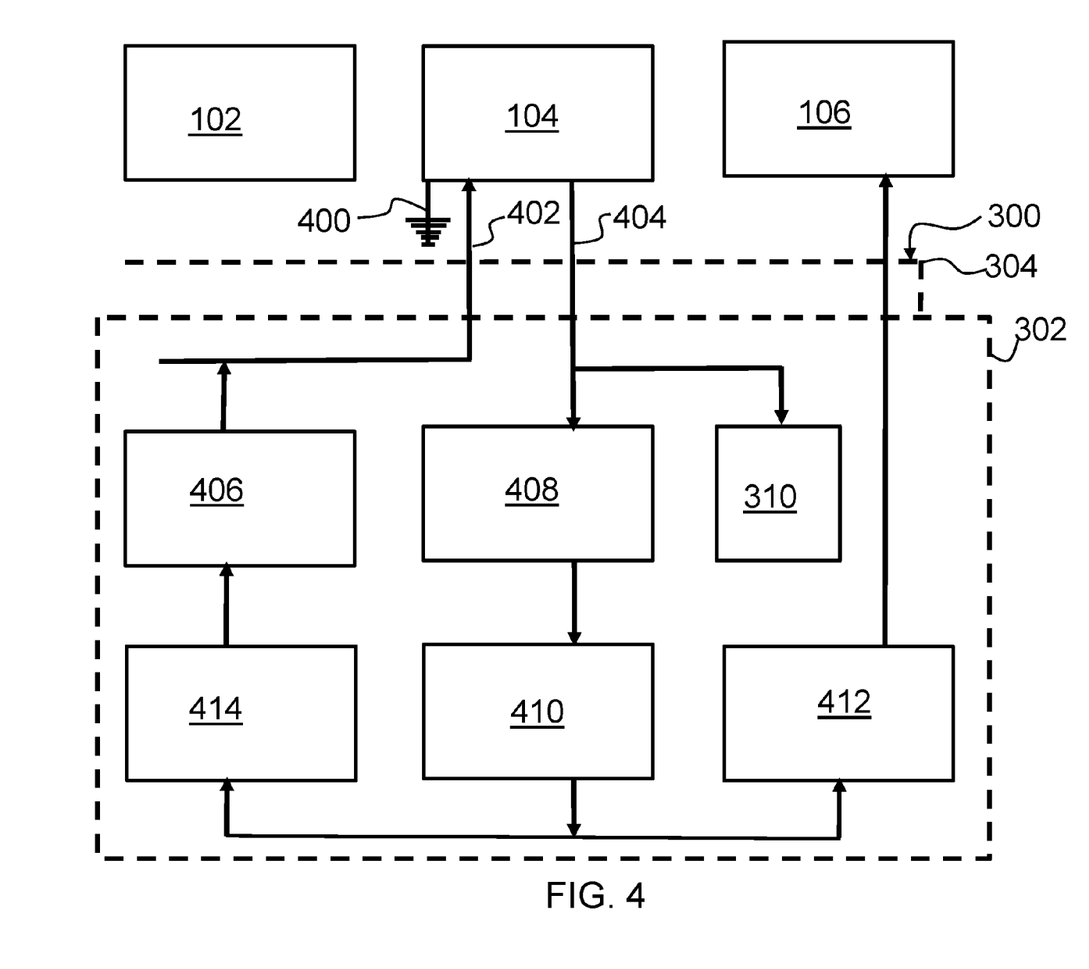
FIG. 4 is a diagram of operations performed by the electronic controller disclosed in FIG. 3.

FIG. 4 is a diagram of the Raspberry Pi 2 computer 302 and the Arduberry shield 304, and multiple electrical conductors respectively interconnecting the conveyor 102, the detector 104 and the solenoid 202 of the removal mechanism 106 to the Arduberry shield 304 without a need for soldering, and from there to the Raspberry Pi 2 computer 302 without a need for soldering. In an alternative embodiment, the electrical conductors respectively are connected to the Raspberry Pi 2 computer 302 by solder connections, bypassing the Arduberry shield 304.

The commercial embodiment of the detector 104 is partially opened to reveal the internal electronic components, to which are connected a first wire 400 for connection to a reference electrical potential or ground, a second wire 402 for receiving an activation signal in the from of an input voltage for turning on the detector 106, and a third wire 404 transmitting an output voltage of the detector indicative of a change in the magnetic field, and transmitting a trigger signal upon at least one foreign object being detected by a change in the magnetic field exceeding a threshold change in the magnetic field. FIG. 4 is a diagram of the wires 400, 402 and 404 and their interconnections with the central controller unit 300.

In FIG. 4, the Raspberry Pi 2 computer 302 is programmed to transmit an activation signal 406 to the detector 104 for turning on the detector 104, wherein the detector activation signal 406 is transmitted through the Arduberry shield 304 to the second wire 402, and from there to the detector 104. The Raspberry Pi 2 computer 302 is programmed to transmit the activation signal 406 to the conveyor 102 for turning on the conveyor 102. The conveyor 102 continues to be turned on to convey laundry articles, and the detector 104 continues to be turned on to produce an output voltage indicative of a change in the magnetic field caused by one or more of the conveyed laundry articles in the magnetic field. The output voltage from the detector 104 is transmitted over the third wire 404 to the Arduberry shield 304, and from there to the Raspberry Pi 2 computer 302.

The Raspberry Pi 2 computer 302 is programmed to receive the output voltage from the detector 104, and convert the same to a video signal, and to transmit the video signal to the HDMI OUT connector 310 serving as a video output connector. The HDMI OUT connector 310 is provided for connecting the video signal to a video monitor in a conventional manner by using a familiar, conventional HDMI cable. For example, the video signal can be connected to the optional video monitor 118. Further the video signal is useful for observing calibration of a threshold voltage and sensitivity to a voltage output spike while being calibrated by programming the Raspberry Pi 2 computer 302.

Upon at least one foreign object being detected by the detector 106, the detector 106 output voltage increases and becomes an output voltage spike serving as a trigger signal transmitted over the wire 404. The Raspberry Pi 2 computer 302 is programmed for calibrating which amplitude level of the voltage spike will serve as a trigger signal, and is programmed for recognizing the output voltage spike from the detector 104 serving as a trigger signal, and for applying a time delay 408 to provide a time delayed trigger signal 412. The time delay 408 corresponds with a time interval within which the conveyor 102 conveys a detected foreign object from being detected by the detector 104 and into a position for removal by the removal mechanism 106, which accounts for a time delay in stopping the conveyor 102, and for time delays of voltage signal transmissions. Following the time delay 408, the Raspberry Pi 2 computer 302 is programmed for providing the time delayed trigger signal 412 for activating the removal mechanism 106, wherein the signal 412 switches the solenoid valve 202 to a position allowing the flow of pressurized air into the cylinder and piston assembly 200 to operate the removal mechanism 106. The solenoid valve 202 remains in position while its initiation signal expires as a time duration pulse.

Further, the Raspberry Pi 2 computer 302 is programmed for supplying the delayed trigger signal 414 for turning off electrical power to the conveyor 102, pausing operation of at least the conveyor 102 by supplying the delayed trigger signal 414 to turn off the AC isolated DC actuated AC power switch of the Power Switch Tail II, Model 80135, which is tuned on and off directly from the electronic controller 300.

Further, the Raspberry Pi 2 computer 302 is programmed with the signal 414 disabling the activation signal 406 to the conveyor 102, while the removal mechanism 106 operates to remove one or more laundry articles with which at least one detected foreign object is commingled. In an alternative preferred embodiment, the signal 414 is supplied for turning off the detector 104 while operation of the conveyor 102 is in a pause mode, and the Raspberry Pi 2 computer 302 is programmed with the signal 414 disabling the activation signal 406 to the detector 104 while operation of the conveyor is in a pause mode. The removal operation is complete upon completion of the stroke of the cylinder and piston assembly 106, while the conveyor 102 remains in a pause mode until reset. The reset occurs by human operation of the reset button 112*e* activating a reset signal 412 to the solenoid valve 202 to allow the flow of pressurized air to withdrawal the piston of the pneumatic cylinder and piston assembly 200 and retract the removal mechanism 106 to a reset position shown in FIG. 1. To resume operation of the apparatus 100 and the conveyor 102, the reset occurs by pressing the reset button 112*e* for activating the activation signal 406 and continuing the conveyance of laundry articles by the conveyor 102.

The Raspberry Pi 2 computer 302 is programmed with a reset cycle of operation, which is activated to switch the solenoid valve 202 to a second position allowing the flow of pressurized air to flow into the cylinder and piston assembly 200 and retract the piston to withdraw the removal mechanism 106 to its reset position. The Raspberry Pi 2 computer 302 is programmed with the reset cycle to restore the activation signal 406 to the conveyor 102 and the detector 104 to resume continued operation of the conveyor 102 thereby continuing the conveyance of laundry articles.

The apparatus 100 is described as being adapted for use with a known conveyor 102 conveying laundry articles while they are being picked and sorted into different kinds of laundry articles. Alternatively the apparatus 100 is adapted for use with a conveyor 102 conveying laundry articles that do not require sorting, and are ready to be laundered or cleaned, but may be commingled with foreign articles that could cause damage to laundry equipment or to laundry articles themselves during a washing or cleaning operation. Further, the apparatus 100 is adapted for use with a conveyor 102 conveying a group of laundry articles that are to be disposed of as infectious waste, but may be commingled with valuable foreign objects that should be retrieved before disposal of the infectious waste. Thus, the apparatus 100 is adapted for use with a conveyor 102 to remove one or more laundry articles with which at least one detected foreign object is commingled, while other laundry articles remain on the conveyor 102 are free from detected foreign objects during their picking and sorting, washing, cleaning or disposal as infectious waste.

Preferred embodiments of the invention are disclosed herein. The invention includes other alternative embodiments and modifications within the spirit and scope of the appended claims.

The invention claimed is:

1. An apparatus adapted for operation with a conveyor on which laundry articles are conveyed while workers manually pick and sort the laundry articles, the apparatus comprising:
    a detector searching the laundry articles for a foreign object by creating a magnetic field through which the laundry articles are conveyed by the conveyor, the detector producing an output voltage indicative of a change in the magnetic field, wherein a change in the magnetic field below a threshold change indicates that the laundry articles in the magnetic field are free from detected foreign objects and safe for the workers to handle, and wherein the laundry articles remain on the conveyor for the workers to manually pick and sort the laundry articles;
    the detector producing a voltage spike in the output voltage upon at least one foreign object being detected by a change in the magnetic field exceeding the threshold change, the voltage spike serving as a trigger signal;
    a removal mechanism activated by the trigger signal, the removal mechanism removing one or more of the laundry articles with which said at least one foreign object is commingled, and leaving other laundry articles on the conveyor while the workers manually pick and sort the other laundry articles, wherein the other laundry articles are free from detected foreign objects and safe for the workers to handle while manually picking and sorting the laundry articles on the conveyor;
    an electronic controller turning on the conveyor, the detector mechanism and the removal mechanism, the electronic controller being activated by the trigger signal and turning off the conveyor and the detector mechanism while the removal mechanism removes the one or more laundry articles with which said at least one foreign object is commingled, and while the other laundry articles remain on the conveyor for the workers to manually pick and sort; and
    a manually actuated button activating the electronic controller to turn on the conveyor and the detector mechanism subsequent to the removal mechanism removing the one or more laundry articles with which said at least one foreign object is commingled.

2. The apparatus as recited in claim 1, further comprising:
    the electronic controller having a computer programmed to turn on the conveyor and the detector, the computer being programmed for receiving the voltage output from the detector and applying a time delay of the trigger signal, and pausing operation of the conveyor by applying the trigger signal to turn off the conveyor following the time delay corresponding to a time interval within which the conveyor conveys said at least one foreign object from being detected by the detector and into a position for removal by the removal mechanism.

3. The apparatus as recited in claim 1 wherein the detector includes a wand-type detector to which are connected, a first wire for connection to a reference electrical potential or ground, a second wire for receiving an activation signal in the from form of an input voltage for turning on the detector, and a third wire transmitting said output voltage of the detector indicative of a change in the magnetic field.

4. The apparatus as recited in claim 1 wherein the removal mechanism comprises, a pneumatic cylinder and piston assembly, a ram element connected to a piston of the assembly, and a solenoid valve activated by the trigger signal and allowing pressurized air into the cylinder and piston assembly for extending the piston and driving the ram element to engage and forcefully remove such one or more laundry articles with which said at least one foreign object is commingled.

5. The apparatus as recited in claim 1 wherein the removal mechanism is spaced apart a distance from the detector in a direction of conveyance of the conveyor, and following a time delay the removal mechanism removes said one or more laundry articles with which said at least one foreign object is commingled, the time delay corresponding with a time interval within which the conveyor conveys said at least one foreign object from being detected by the detector and into a position for removal by the removal mechanism.

6. The apparatus as recited in claim 1, further comprising:
    the electronic controller having a video output connector and a computer programmed to turn on the conveyor and the detector, the computer being programmed to receive the voltage output from the detector, the computer being programmed to convert the voltage output to a video signal and to transmit the video signal to the video output connector; and
    a video monitor connected to the video output connector for displaying the voltage output from the detector as a graph of output voltage amplitude.

7. The apparatus as recited in claim 1, further comprising:
    the electronic controller having a computer programmed to turn on the conveyor and the detector, the computer being programmed for receiving the voltage output from the detector and applying a time delay of the trigger signal, and pausing operation of the conveyor by applying the trigger signal to turn off the conveyor following the time delay corresponding to a time interval within which the conveyor conveys said at least one foreign object from being detected by the detector and into a position for removal by the removal mechanism, and the computer being programmed for turning off the detector while pausing operation of the conveyor.

8. The apparatus as recited in claim 1, wherein the conveyor is a moving belt conveyor having an input end onto which the laundry articles are deposited for conveyance by the conveyor, and the removal mechanism is spaced apart from the detector in a direction of said conveyance.

9. The apparatus as recited in claim 1, further comprising:

the detector and the removal mechanism being mounted on a framework of their own for positioning adjacent to the conveyor.

10. The apparatus as recited in claim 1, further comprising:

a conveyor framework on which the conveyor is mounted; and the detector and the removal mechanism being mounted on a framework of their own attached to the conveyor framework.

11. The apparatus as recited in claim 1, further comprising:

the electronic controller having a computer programmed to turn on the conveyor and the detector, the computer being programmed for receiving the voltage output from the detector and applying a time delay of the trigger signal, and pausing operation of the conveyor by applying the trigger signal to turn off the conveyor following the time delay corresponding to a time interval within which the conveyor conveys said at least one foreign object from being detected by the detector and into a position for removal by the removal mechanism; and the detector, the removal mechanism and the electronic controller being mounted on a framework of their own for positioning adjacent to the conveyor.

12. The apparatus as recited in claim 1, further comprising:

the electronic controller having a computer programmed to turn on the conveyor and the detector, the computer being programmed for receiving the voltage output from the detector and applying a time delay of the trigger signal, and pausing operation of the conveyor by applying the trigger signal to turn off the conveyor following the time delay corresponding to a time interval within which the conveyor conveys said at least one foreign object from being detected by the detector and into a position for removal by the removal mechanism; and the detector, the removal mechanism and the electronic controller being mounted on a framework of their own attached to the conveyor framework.

* * * * *